United States Patent
Niikura et al.

[11] Patent Number: 5,348,814
[45] Date of Patent: Sep. 20, 1994

[54] INTERNAL REFORMING TYPE MOLTEN CARBONATE FUEL CELL

[75] Inventors: Junji Niikura, Hirakata; Eiichi Yasumoto, Kadoma; Kazuhito Hatoh, Daito; Takaharu Gamo, Fujiidera, all of Japan

[73] Assignee: Matsushita Electric Industrial Co., Ltd., Kadoma, Japan

[21] Appl. No.: 28,976

[22] Filed: Mar. 10, 1993

[30] Foreign Application Priority Data

Mar. 11, 1992 [JP] Japan ................................. 4-052369
May 22, 1992 [JP] Japan ................................. 4-130402

[51] Int. Cl.⁵ ........................................... H01M 8/06
[52] U.S. Cl. ........................................... 429/19; 429/20; 429/34
[58] Field of Search ....................... 429/19, 20, 17, 16, 429/34, 38, 39

[56] References Cited

U.S. PATENT DOCUMENTS

| | | |
|---|---|---|
| 4,365,007 | 12/1982 | Maru et al. . |
| 4,567,117 | 1/1986 | Patel et al. ............................. 429/19 |
| 4,618,543 | 10/1986 | Matsumura et al. .................. 429/19 |
| 4,647,516 | 3/1987 | Matsumura et al. . |
| 5,077,148 | 12/1991 | Schora et al. ......................... 429/16 |
| 5,100,743 | 3/1992 | Narita et al. . |
| 5,212,022 | 5/1993 | Takahashi et al. .................... 429/19 |

Primary Examiner—Anthony Skapars
Attorney, Agent, or Firm—Ratner & Prestia

[57] ABSTRACT

There is provided an internal reforming type molten carbonate fuel cell comprising unit cells, bipolar plates and plate-like reformer each having the same peripheral shape and being stacked to form a cell stack which is penetrated by an inside manifold for supplying the raw fuel, exhausting the reacted gas, etc., wherein the plate-like reformer is provided with props and reforming catalyst so arranged that uniform temperature distribution in the cell, reduced IR loss in operation, and long life were obtained.

8 Claims, 3 Drawing Sheets

INTERNAL REFORMING TYPE MOLTEN CARBONATE FUEL CELL

BACKGROUND OF THE INVENTION

1. Field of the Invention

This invention relates to an internal reforming type molten carbonate fuel cell comprising plural unit cells, bipolar plates, and a plate-like internal reformer stacked to each other, particularly to the one of internal manifold type, and more particularly to the inside structure and arrangement of reforming catalyst in the reformer.

2. Prior Art

In a molten carbonate fuel cell (hereinafter abbreviated as MCFC), use of a reductant gas consisting mainly of hydrogen as the fuel gas or the anode active material is common practice. To obtain the fuel gas for a large scale electric power-generating system of MCFC, such a fuel gas is thought of as water gas or that obtained by reforming natural gas with water. Meanwhile, for an on-site power generation for a small demand such as a building or a unit residential area, town gas such as natural gas consisting mainly of methane is thought of. In a power generating system of small scale, however, to provide a raw-fuel-reformer which needs heating separated from the power-generator proper consisting of cell stacks resulted in a complex system with low thermal efficiency and high cost. Thus, for a MCFC for on-site power generation an internal reforming type MCFC which reforms the raw fuel supplied directly into the generator proper raised hopes for practical use and is earnestly investigated. Such internal reforming system is based on the fact that the exothermic reaction in the cells following the power generation of MCFC and Joule's heat due to ohmic resistance in and between the cells produce temperature rise of MCFC which is sufficient for the reaction reforming the gaseous raw fuel by water vapor. The endothermic property of the reforming works advantageously for the balance of thermal income and outgo. Thus, the internal reforming system having no needs for providing a reformer separate from the cell stacks is of simple and compact structure and of low cost. Moreover, the heat generation of the generator proper while being operated make the heating of the reformer unnecessary and heat efficiency of the system high, and the use of the town gas already supplied to the electric power consumer as the raw fuel results in the further reduction of power generation cost, etc. Two types of internal reforming have been proposed; direct and indirect. The direct internal reforming system, as is shown in U.S. Pat. Nos. 3,615,839, 4,182,795 et al., comprises a reforming catalyst deposited in the fuel gas chamber of the anode of the unit cell, and has the reforming and power generating reaction proceeding side by side, and attains high thermal efficiency. It, however, has the disadvantage of deterioration of the catalyst due to the molten carbonate electrolyte or electrolyte vapor through the anode since the catalyst is placed near the anode.

On the other hand, the indirect internal reforming system has the cell part reacting to generate electric power and reforming part separated from each other, wherein the raw fuel such as methane is reformed at the reforming part and the generated fuel gas is supplied to the anode.

This system, while somewhat inefficient in thermal efficiency due to the separated electric power generating part and reforming part, has the catalyst not being deteriorated rapidly. In the indirect system, the structure and the arrangement of the catalyst in the reforming apparatus is important in view of thermal balance with the cell.

The means to supply the fuel gas to the unit cell forming the cell stack of the electric power generating part is divided into two types: external manifold type and internal manifold type. The external manifold type MCFC comprises unit cells each having gateways for fuel gas of anode and for oxidant gas on both sides and these gateways are provided with outer manifolds of chest form to supply the unit cells with necessary gases. On the other hand, in the internal manifold type each of the gases is supplied to the unit cells through gas flow hole or internal manifolds provided in the frame surrounding the unit cells.

In the indirect internal reforming MCFC with outer manifold, of which a structure, for example to divide the inside of manifold into two, is shown in specifications of Japanese Patent Application Open-laying No. Sho 61-13576 or U.S. Pat. No. 5,100,743 incorporated herein by reference, the construction of the manifold is complex and reliable gas sealing is difficult. The transfer of electrolyte through the sealing material of manifold required preventive measure. Further, sometimes at the beginning of operation the height of a cell stack decreases so much that it cannot be neglected. This phenomenon arises when, at the beginning of operation, the temperature of the cell stack rises, and the electrolyte of carbonate in the mixed molding sheet consisting of the electrolyte and electrolyte holding agent melts and is impregnated in the electrolyte holding plate resulting in shrinkage of the molding sheet. Thus the outer manifold type results in more and more difficulty as the number of cells of a cell stack increases.

Meanwhile, as for the indirect internal reforming type MCFC with internal manifold there is proposed for example, a MCFC in which the unit cells are divided in two and the upper stream part thereof is provided with reforming catalyst, as is seen in the specification of Japanese Patent Application Open-laying No. Hei 3-105865 incorporated herein by reference. In such a structure, the parts of unit cells assigned to reforming have the temperature fall while at other power generating parts the temperatures rise. Thus non-uniform temperature distribution in the unit cells was a shortcoming. Another example of the indirect internal reforming MCFC of internal manifold type involves a plate-like internal reformer divided in two along its main plain surface to form two chambers, of which one is filled with reforming catalyst and the other with catalyst for combustion of not-yet-reacted fuel gas exhausted from the fuel electrode of anode. It is thought of that this internal reformer is held between two unit cells, and reformation is made using combustion heat from the catalytic combustion and reaction heat from the power generation. In this structure, however, the cell adjacent to the reforming side of the reformer is cooled and the cell adjacent to the part where the not-yet-reacted fuel gas is catalystically burnt is heated. Aside from this shortcoming, in this structure the cell stack complex has a requirement to supply air for burning not-yet-reacted fuel gas. Further, proposed is an idea to prepare plural kinds of catalyst in the direct internal reforming type MCFC to cope with various kinds of fuels, as is seen in the specification of Japanese Patent Application Open-laying No. Sho 61-34865 incorporated herein by reference. Also, the specification of Japanese Patent Application Open-laying No. Sho 63-310574 incorporated herein by reference teaches to provide reforming catalyst with less deposition of carbon at the upper stream of raw fuel than at the down stream. However, in any of these teachings no measures to make the temperature distribution in a cell uniform are found.

As described above, when indirect internal reforming type is applied to a MCFC, it is an important factor that the heat accompanied by the electric power generation in a unit cell and the heat absorbed by the reforming reaction in a reformer match each other. If the balance of these thermal inputs and outputs is not adequate, a high temperature spot or low temperature spot will arise resulting in the decrease of electric power generation efficiency.

SUMMARY OF THE INVENTION

An internal reforming type molten carbonate fuel cell comprises unit cells, bipolar plates, and a plate-like reformer being stacked to form a cell stack, and the unit cells, bipolar plates, and a reformer are penetrated by internal manifolds for raw fuel, fuel gas, and oxidant gas with openings to the unit cells, bipolar plates and reformer. The reformer is filled with reforming catalyst. In the MCFC, the plate-like reformer is supplied with raw fuel and water vapor through a manifold and reforms the raw fuel to a fuel gas, which, then, is sent through another manifold to every unit cells for electric power generation there.

DETAILED DESCRIPTION OF THE EMBODIMENTS

Figure 1:
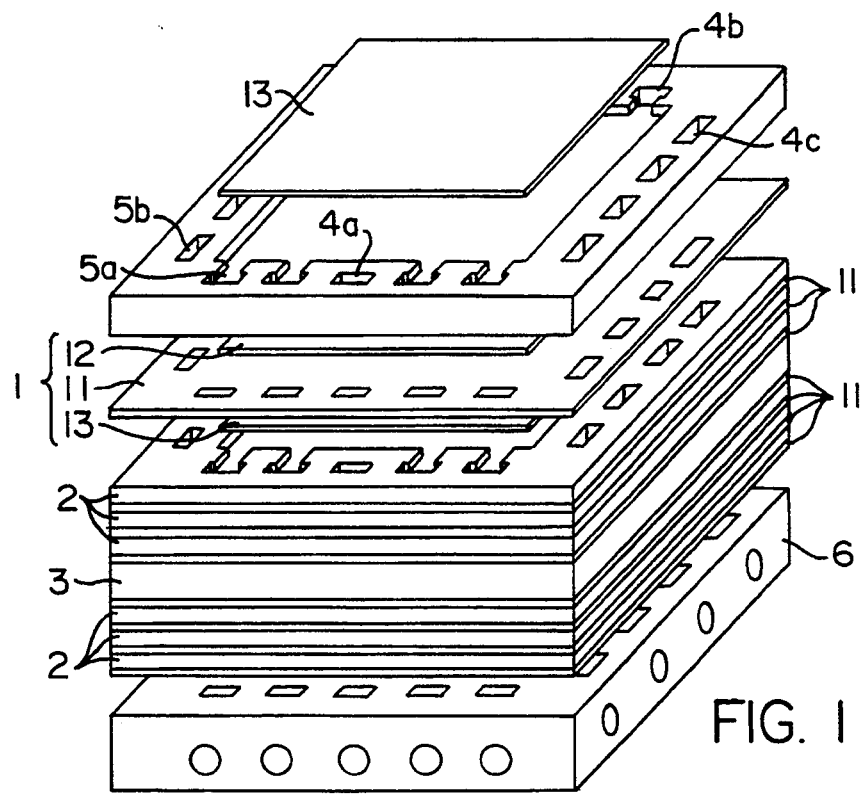
FIG. 1 is a perspective view of a internal reforming MCFC according to the present invention.

The general structure of a internal reforming type MCFC according to the present invention is shown in FIG. 1. The internal reforming type MCFC comprises a unit cell 1 which further includes a electrolyte plate 11 having on one side thereof an anode fuel electrode 12 lined by a perforated wave-shaped current-collector, and on the other side cathode oxidant electrode 13 also lined by a similar current collector. Between the two unit cells, deposited is a separator plate or bipolar plate 2, of which one surface is brought to contact with the anode current collector of the adjoining unit cell and the other surface with the cathode current collector of other adjoining unit cell to work as the electric conductive plate series-connecting the plural unit cells. A plate-like internal reformer is placed between two of the unit cells instead of the bipolar plate. The plate-like reformer 3 is the same form as the bipolar plate 2 except it is thick. The cell stack consisting of the unit cell 1, bipolar plate 2, and plate-like reformer 3 is provided with an internal manifold holes 4a, 4b, and 4c for supply of gaseous raw fuel, fuel gas, and oxidant gas respectively, and also internal manifold holes 5a and 5b for exhausting the fuel gas and oxidant gas respectively, so that the raw fuel and oxidant gas are sent from it and the waste gas after electric power generating reaction is exhausted through a header 6 at the bottom of the cell stack. In the following, an embodiment of a plate-like internal reformer is described in detail, which is an essential part of the present invention.

Figure 2:
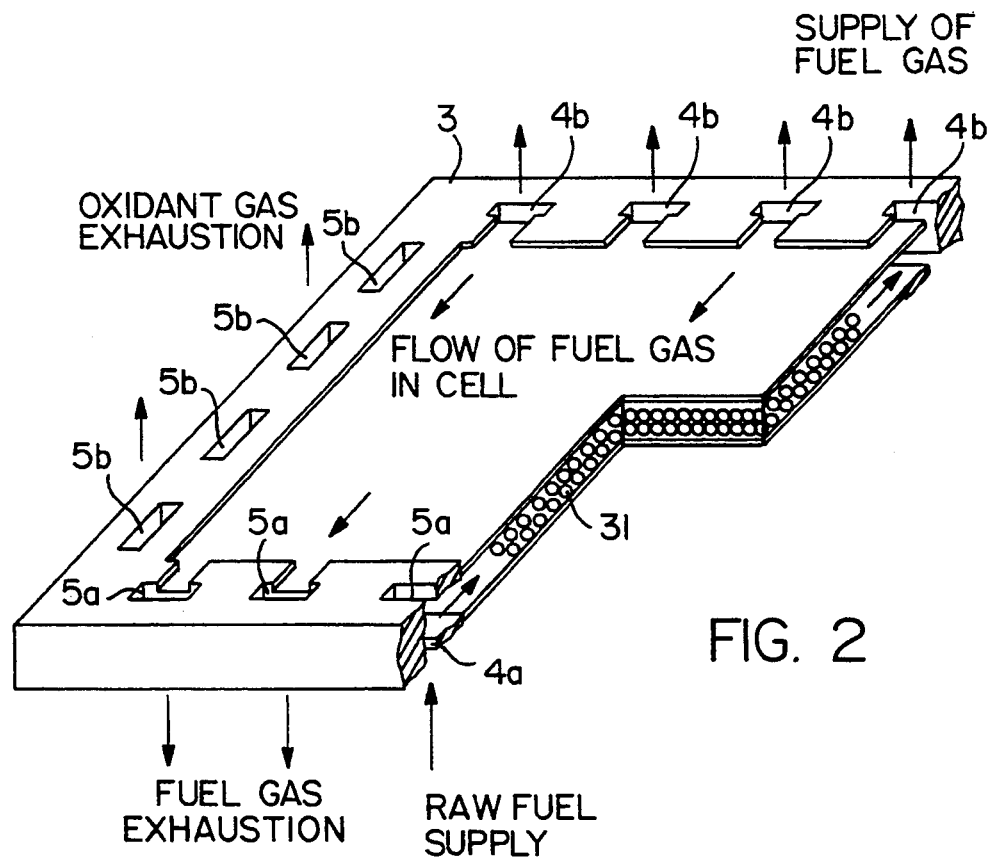
FIG. 2 is a perspective view showing the inside structure of a plate-like reformer according to the present invention.

Referring to FIG. 2, partially broken perspective view of the plate-like internal reformer 3, the raw fuel is sent through the internal manifold hole 4a into the inside of reformer and is reformed, while passing through the layer filled with catalyst 31, by the heat generated by the neighbouring unit cell, to a fuel gas, which then is supplied through the internal manifold 4b to the anode of each unit cell.

On the plate-like reformer 3 is placed a unit cell with the anode collector plate facing the reformer 3, and the fuel gas flows through the space thus formed and supplied to the anode contributing to the electric power generation. The waste gas produced by reaction is exhausted through the internal manifold hole 5a. The oxidant gas is exhausted via the exhausting manifold hole 5b. The plate-like reformer of the present invention, involving reforming catalyst therein, has the form and size same as the bipolar plate except it is of large thickness, and works for both reforming of the raw fuel to the fuel gas and for functioning as the bipolar plate. Also, as the plate-like reformer according to the present invention is an indirect type, the reforming catalyst is not easily corroded by the electrolyte of molten carbonate or its vapor, resulting in long life. Further, the reformer, with no heat generation by the fuel gas, has the advantage of uniformly cooling the adjacent unit cell.

Figure 3:
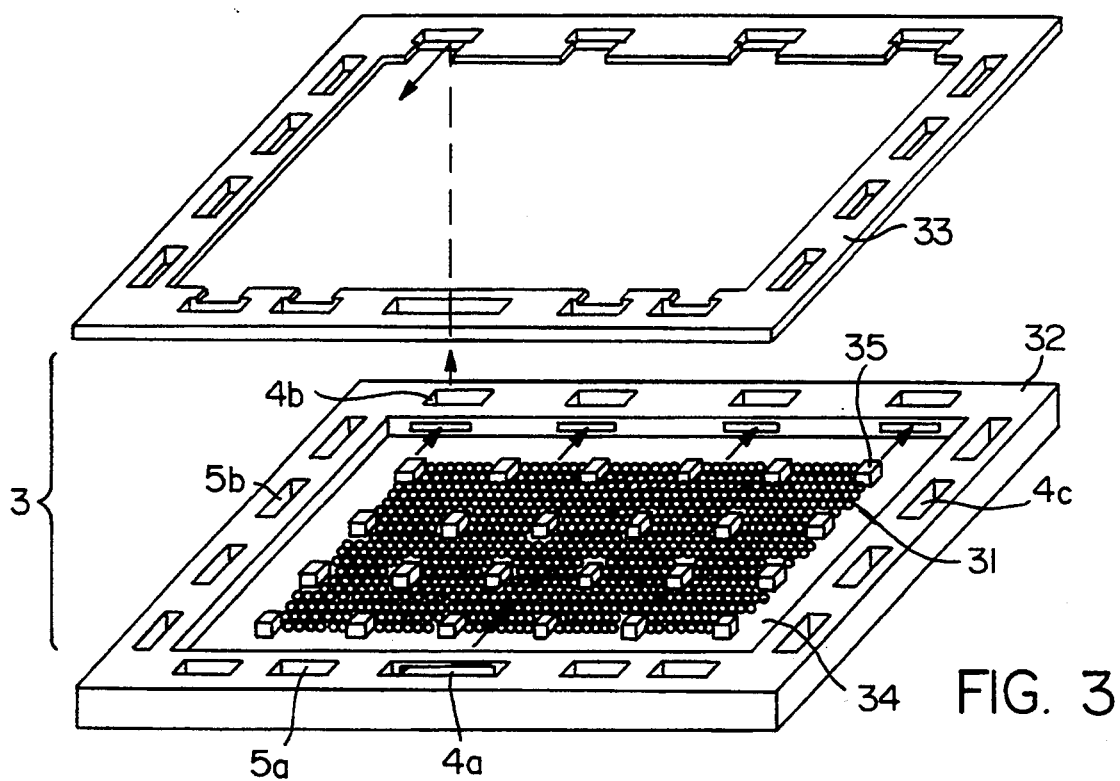
FIG. 3 is a perspective view showing the inside structure of another plate-like reformer according to the present invention.

Referring to FIG. 3, a plate-like internal reformer according to the present invention comprises a frame 32, a bottom plate 34, an upper plate 33, and plurality of props 35, placed between the upper and bottom plates, made of heat resistant, corrosion-resistant alloy such as stainless steel containing molybdenum, and fixed hermetically by welding or soldering. The frame 32 is of 40 cm length, 40 cm width, and 1.2 cm thickness and the props 35 of $1 \times 1$ cm² section are arranged at intervals of 5 cm. These frame 32, bottom plate 34, upper plate 33, and prop 35 are made of heat-resistant, corrosion-proof alloy such as stainless steel containing molybdenum. The reformer is filled with reforming catalyst 31, which is deposited all over on the bottom plate 84 with spacing of 5 cm from the inside edge of the frame 32.

A cell stack was constructed, which consisted of ten unit cells having a plate-like reformer fixed between the fifth and sixth cells, and eight bipolar plates between the other cells. With the cell stack thus made, electric power generation was tried by supplying the plate-like reformer with a mixed gas consisting of town gas mainly constituting methane and water vapor, the water vapor/carbon ratio of the mixed gas being 3.5. The mixed gas was heated to 650° C. beforehand. Also supplied were oxidant gas consisting of air and carbon dioxide and previously heated likewise, the ratio of air: $CO_2$ being 70:30. The stack was given pressure of 4t(2.5 kg/cm²) perpendicular to the main surface while being operated. The temperature of various points of the stack were measured and found to be very uniform with 660° C. at the highest point, 620° C. at the lowest point, difference being 40° C., and, 650° C. average. The voltage drop in the plate-like internal reformer, when 100 Å current was taken, was only 5 mV, very small IR loss. After one month of operation, the external appearance of the plate-like reformer was inspected without finding any deformation.

For comparison, another cell stack was prepared, whose plate-like reformer involved, instead of the plural block type prop as described above, a parting section of 1 cm width placed at the intersection of diagonal lines alongside the direction of gas. On similar trial operation of the comparison stack, the temperature distribution in the reformer spreads over 70° C., and the voltage drop in the plate-like reformer for 100 Å current was 35 mV showing larger IR loss. Also, on inspection of the external appearance after long time operation the parts of the plates without supporting of prop were deformed, and the thermal and electric conduction between plates were deteriorated. Investigation was made on the distance between the props, which was 5 cm for the above described embodiment, and it was found that less than 10 cm was preferrable. Further, instead of the square section, other form of section, for example plate, was found to be enough.

Figure 4:
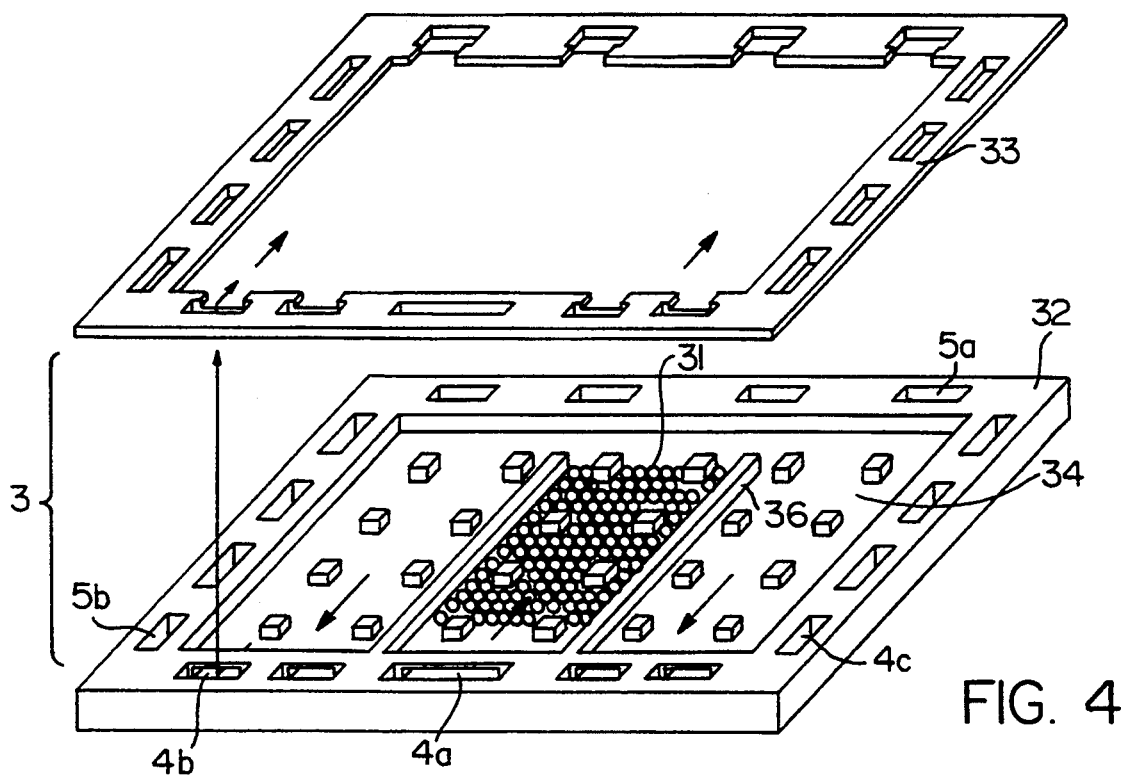
FIG. 4 is a perspective view showing the inside structure of still another plate-like reformer according to the present invention.

Referring to FIG. 4, another embodiment of the plate-like internal reformer of the present invention is explained in the following. This embodiment of the reformer comprises an outer frame 32, a bottom plate 34, with props 35 of square section, and two parting strips 36 dividing the inside space of the reformer into three spaces and connected at one end thereof with the inside wall of the outer frame but separated somewhat at the other ends, forming two notches. Reforming catalyst is deposited in the central space. It is preferred that, in the central space, the parts adjacent to the inside manifold hole 4a and adjacent near the gas outlets, catalyst is not deposited, since the excessive temperature rise of the central part of the unit cells arranged on both sides of the plate-like reformer are suppressed by the reforming reaction resulting in uniform temperature distribution. In the plate-like reformer, the raw fuel is supplied from the inside manifold hole 4a, and reformed while passing through the reforming catalyst in the central space to become fuel gas, which flows through the outlets of the central space to the gas passage on both sides, where each of the divided gas flows to the direction opposite from that in the central space to manifold holes situated on both sides of the hole for raw fuel to be further sent to the anode of each unit cell.

With the plate-like reformer as shown in FIG. 4, a cell stack was assembled and operated likewise as the above described ones. When the cell stack was operated at the average temperature of 650° C., the highest and the lowest parts were of 660° C. and 630° C. respectively; only 30° C. spread, and improvement of temperature uniformity within the reformer and cell stack was confirmed.

Figure 5:
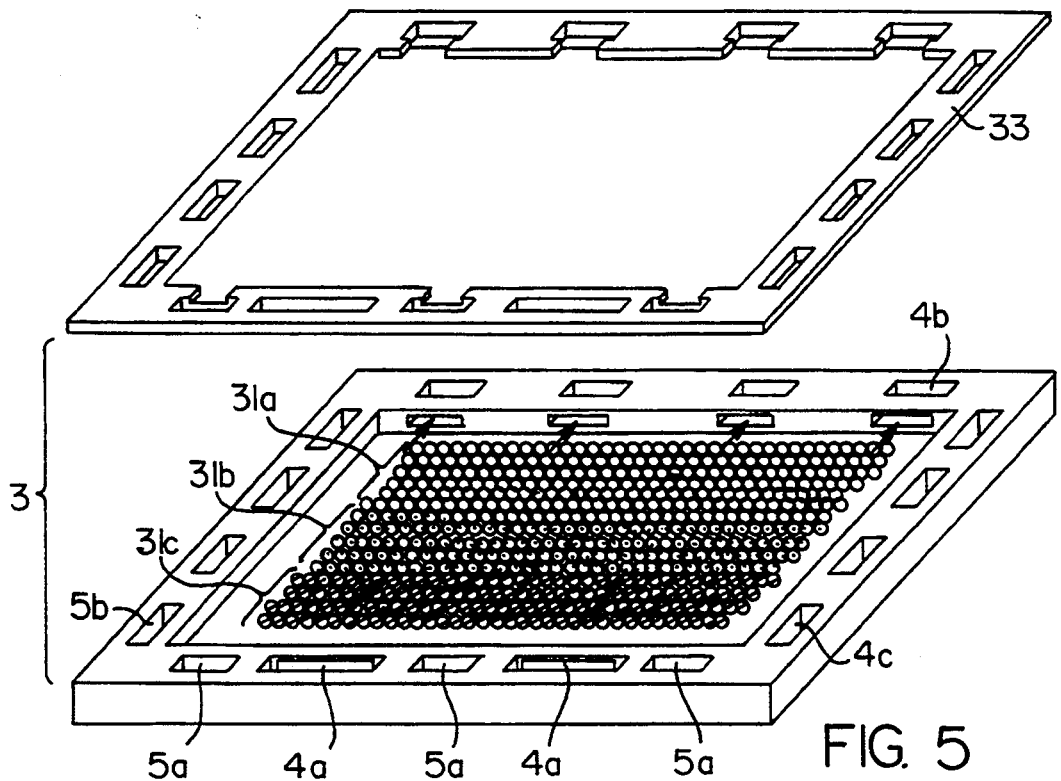
FIG. 5 is a perspective view schematically showing an example of the arrangement of reforming catalyst in a plate-like reformer according to the present invention.

Referring to FIG. 5, another embodiment of the present invention which involves another arrangement of the reforming catalyst in the reformer frame is explained. This reformer involves an outer frame 32, upper plate 33, bottom plate 34, and prop 34 (not shown), and, on the bottom plate 34, there are placed three kinds of reformer catalyst; the gas flow passes through the catalyst 31c with the lowest reforming capability, then through the catalyst 31b with moderate capability and lastly meets the most efficient catalyst. By such an arrangement of the catalyst, reforming reaction became uniform over the whole area of the catalyst, whereas, with uniform disposition of catalyst the temperature was lower at the upper stream of the fuel flow, where the density of the fuel is larger and the reforming reaction is more active. Catalyst with different reforming capability is obtained, by changing to a metal catalyst carried on a carrier as α-alumina, by changing the carring amount if the catalyst metal is of the same kind, or by mixing a catalyst of high reforming capability with another catalyst of the same shape or size but of lesser reforming capability or carrier only.

Figure 6:
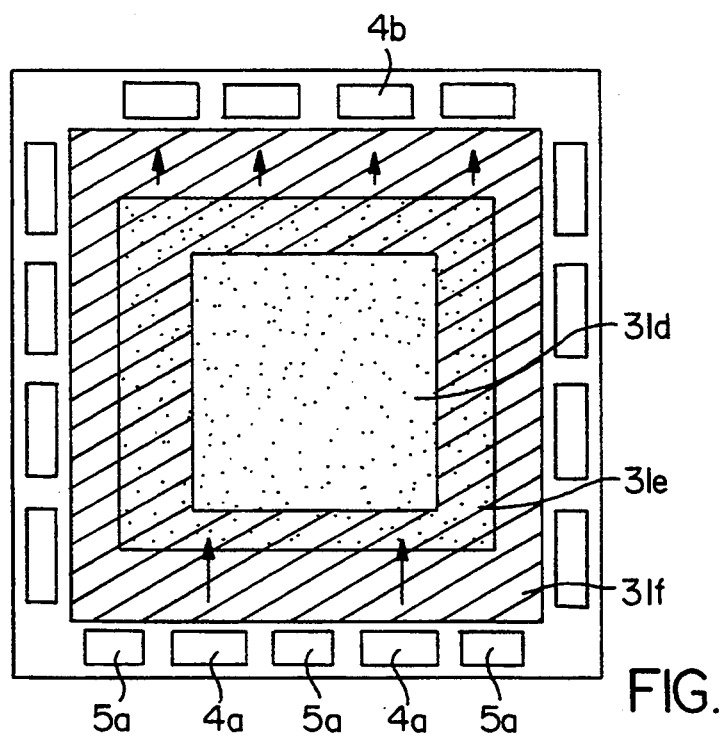
FIG. 6 is a plan view schematically showing another example of the arrangement of reforming catalyst according to the present invention.

Referring to FIG. 6, showing still another example of the catalyst arrangement, the catalyst 31d with high reforming capability is deposited at the middle of the bottom plate, and, from the middle to the periphery arranged are the catalysts 31e and 31f with less or no reforming capability.

To keep the reforming catalyst at the central part of the reforming plate leaving the outer space vacant, the central part is surrounded by a porous inner frame. Even if peripheral part 31f in FIG. 6 is filled with a dummy catalyst with no or very small reforming capability the essence of the present invention can be realized. With such a dummy catalyst at the periphery, which improves the endothermic reaction in the reformer, and the thermal conduction by the exothermic reaction at the unit cells arranged at the upper and under side, bringing uniform distribution of temperature.

Although, the present invention was explained on the plate-like reformers of square frame, the spirit of the invention can be applied to the ones with polygonal or circular frames. Also, the catalyst may include other material; for example, one to eliminate the carbonate vapor. Further, the number of the plate-like reformer inserted in cell stacks is determined depending on the ability of the generation and consuming of the fuel gas.

What is claimed:

1. An internal reforming type molten carbonate fuel cell comprising unit cells, bipolar plates and a plate-like reformer stacked to form a cell stack, said unit cells, bipolar plates and reformer being penetrated by internal manifolds for raw fuel, fuel gas and oxidant gas with openings to the unit cells, bipolar plates and reformer, said reformer being provided with reforming catalyst, wherein said reformer is provided with two parting strips parallely crossing the interior of the reformer to divide it into three parts, an inside space and two outside spaces, and being connected at one end of each to an inside wall of the frame but being separated at the other ends of the inside wall of the frame to form notches; an inside manifold for the raw fuel is provided with an opening to inside parts and inside manifolds for the fuel gas arranged at both sides of the inside manifold for the raw fuel are provided with openings to the outside spaces; and the inside space only is filled with reforming catalyst.

2. The internal reforming type molten carbonate fuel cell according to claim 1 wherein the plate-like reformer is provided with a plurality of props separated less than 10 cm from each other.

3. The internal reforming type molten carbonate fuel cell according to claim 1, wherein the reforming catalyst is arranged so that the catalyst has higher reforming capability at a down stream part of the raw fuel.

4. The internal reforming type molten carbonate fuel cell according to claim 2, wherein the reforming catalyst is arranged so that the catalyst has higher reforming capability at a down stream part of the raw fuel.

5. The internal reforming type molten carbonate fuel cell according to claim 2, wherein the reformer is provided with a center and a periphery and wherein the reforming capability of the reforming catalyst is higher at the center of the reformer than at the periphery of the reformer.

6. The internal reforming type molten carbonate fuel cell according to claim 3, wherein the reforming capability of the reforming catalyst is accomplished by converting a catalyst with lower or no reforming capability into a catalyst with high reforming capability.

7. The internal reforming type molten carbonate fuel cell according to claim 4, wherein the reforming capability of the reforming catalyst is accomplished by converting a catalyst with lower or no reforming capability into a catalyst with high reforming capability.

8. An internal reforming type molten carbonate fuel cell comprising unit cells, bipolar plates and a plate-like reformer stacked to form a cell stack, said unit cells, bipolar plates and reformer being penetrated by internal manifolds for raw fuel, fuel gas and oxidant gas with openings to the unit cells, bipolar plates and reformer, said reformer being provided with reforming catalyst, wherein the reformer is provided with a center and a periphery and wherein the reforming capability of the reforming catalyst is higher at the center of the reformer than at the periphery of the reformer.

* * * * *